Dec. 27, 1960     H. A. TOULMIN, JR     2,966,128
MACHINE FOR CONDITIONING SOIL
Filed Sept. 3, 1953     6 Sheets-Sheet 2
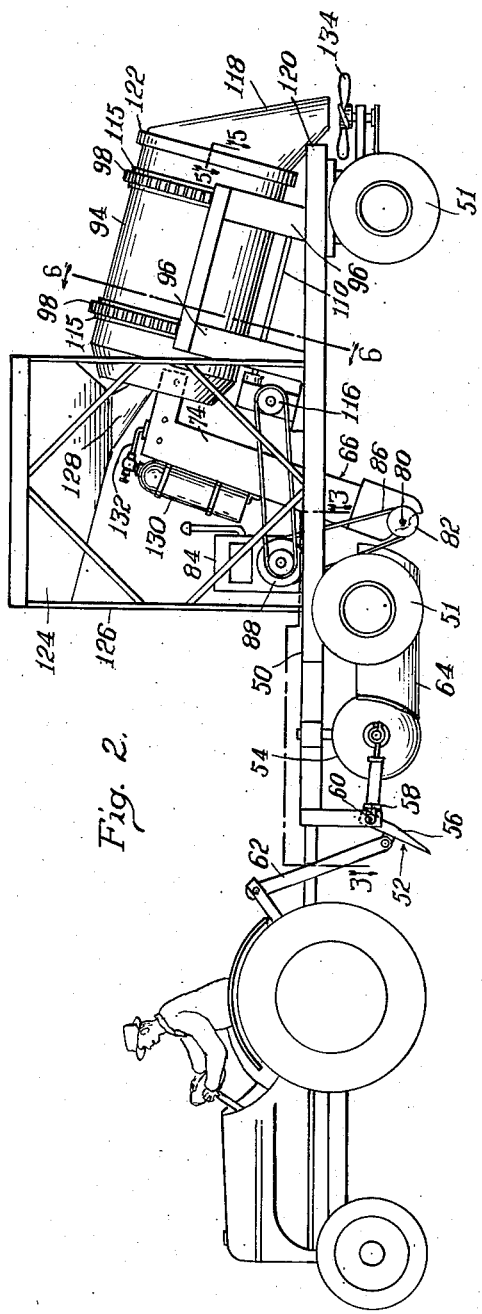
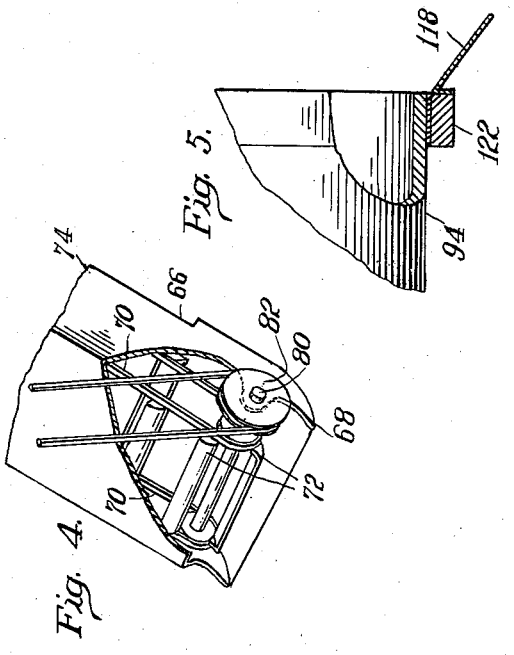
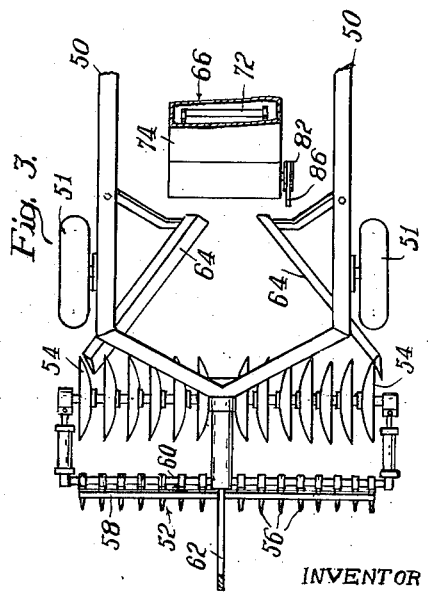
INVENTOR
Harry A. Toulmin Jr.
BY Toulmin & Toulmin
ATTORNEYS

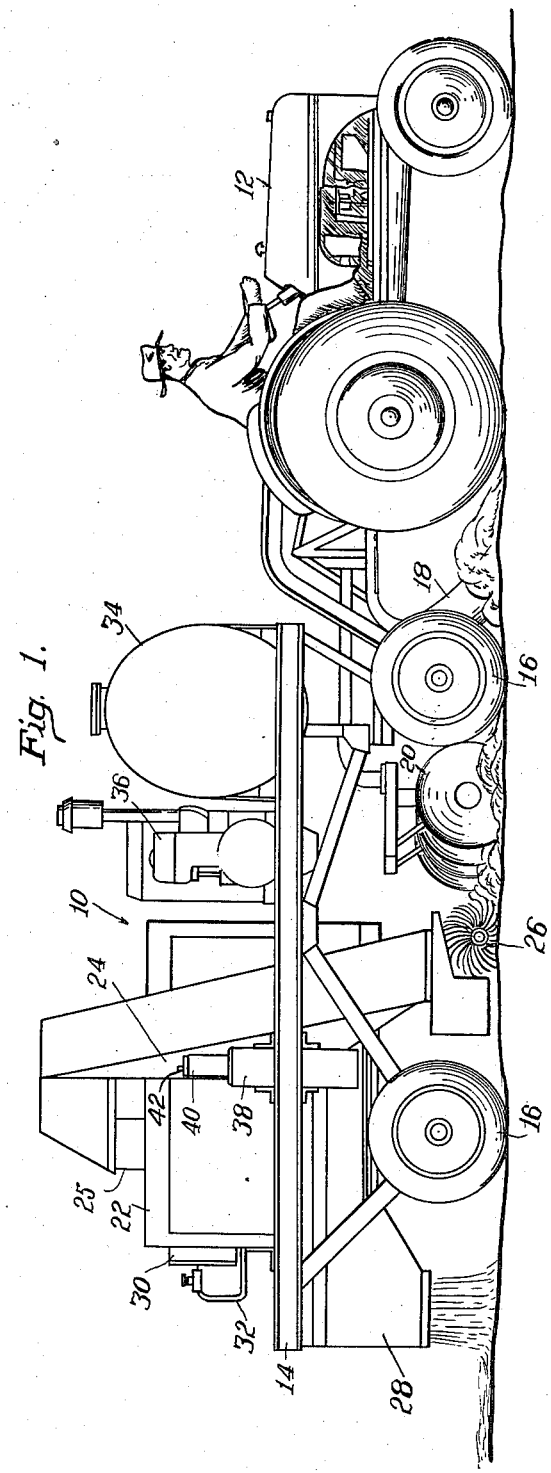

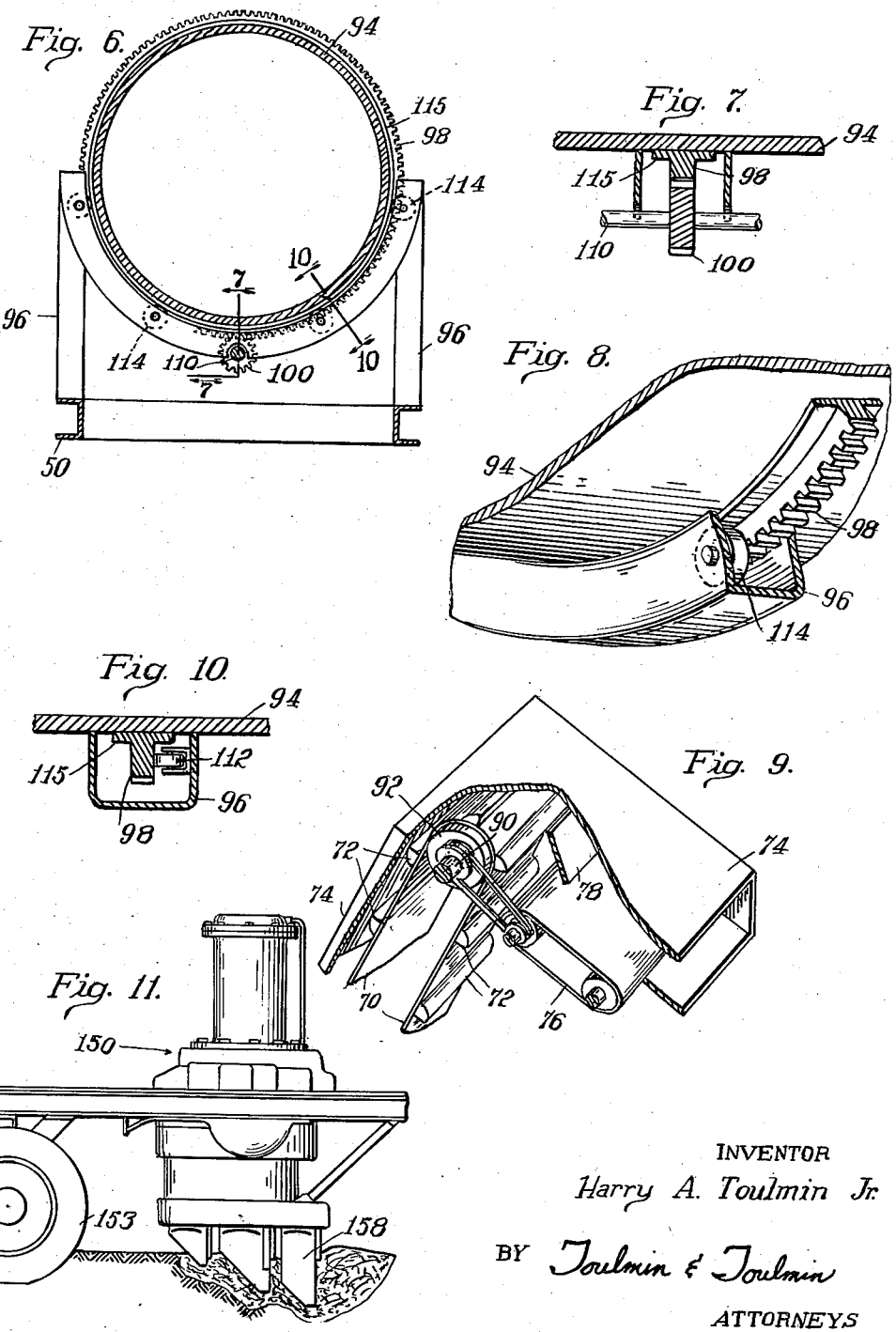

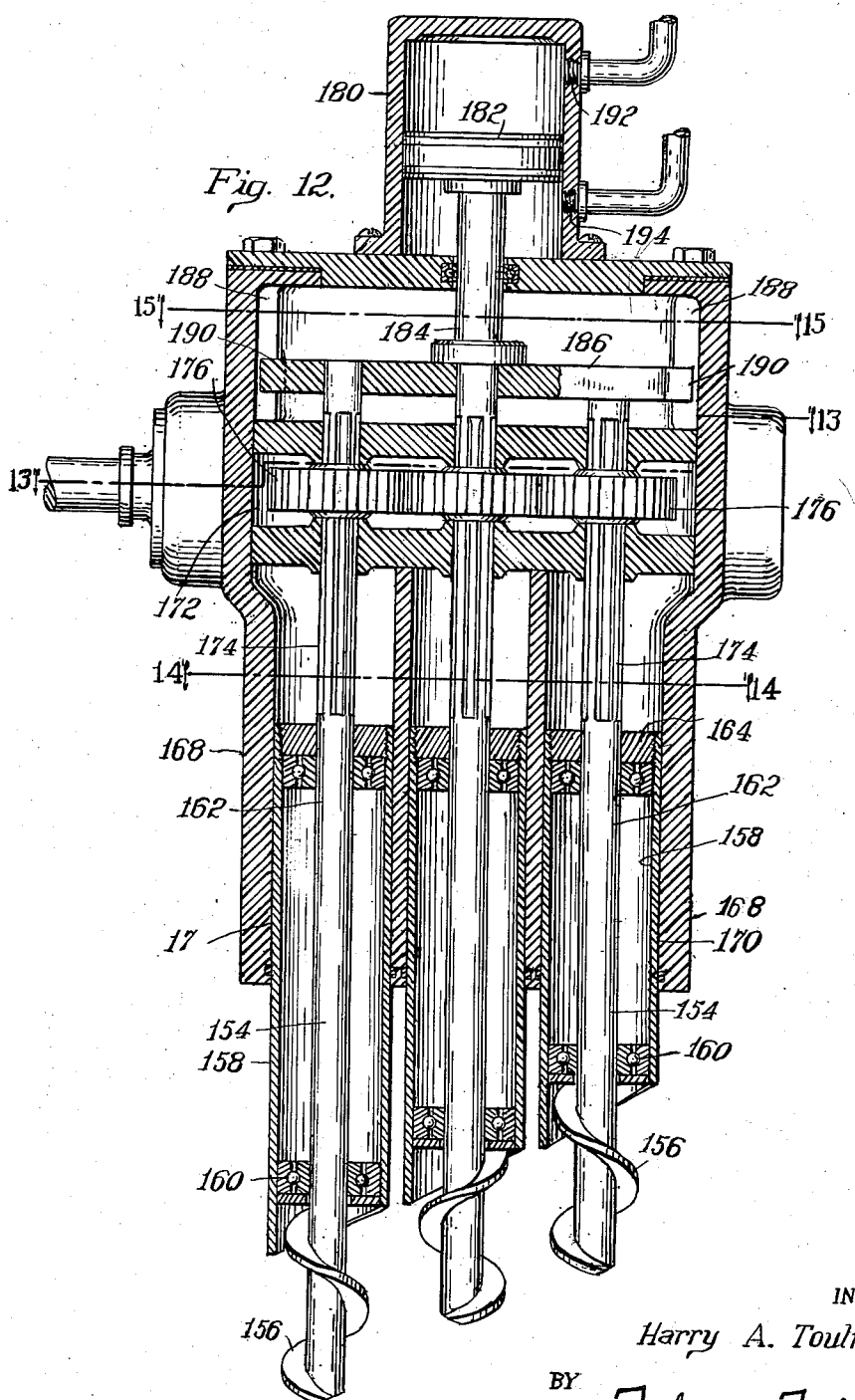

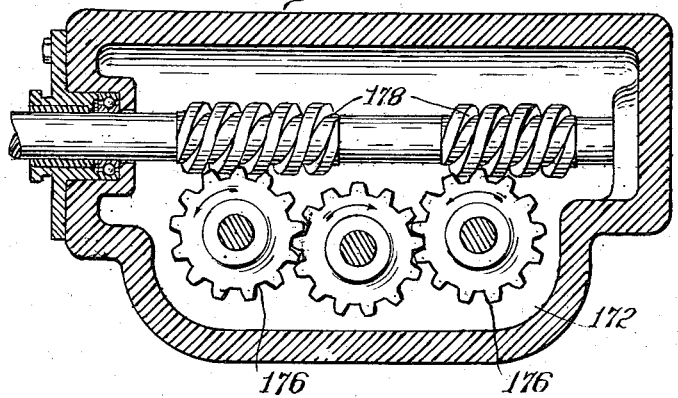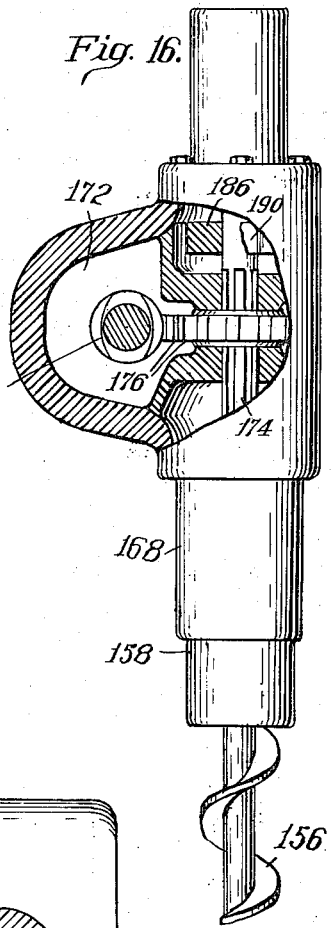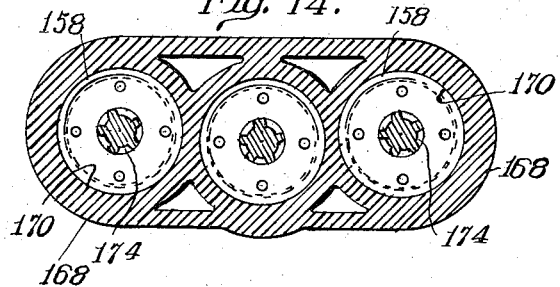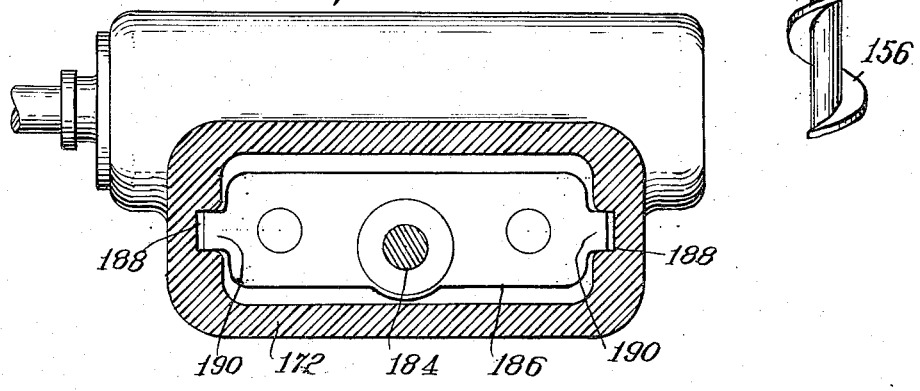

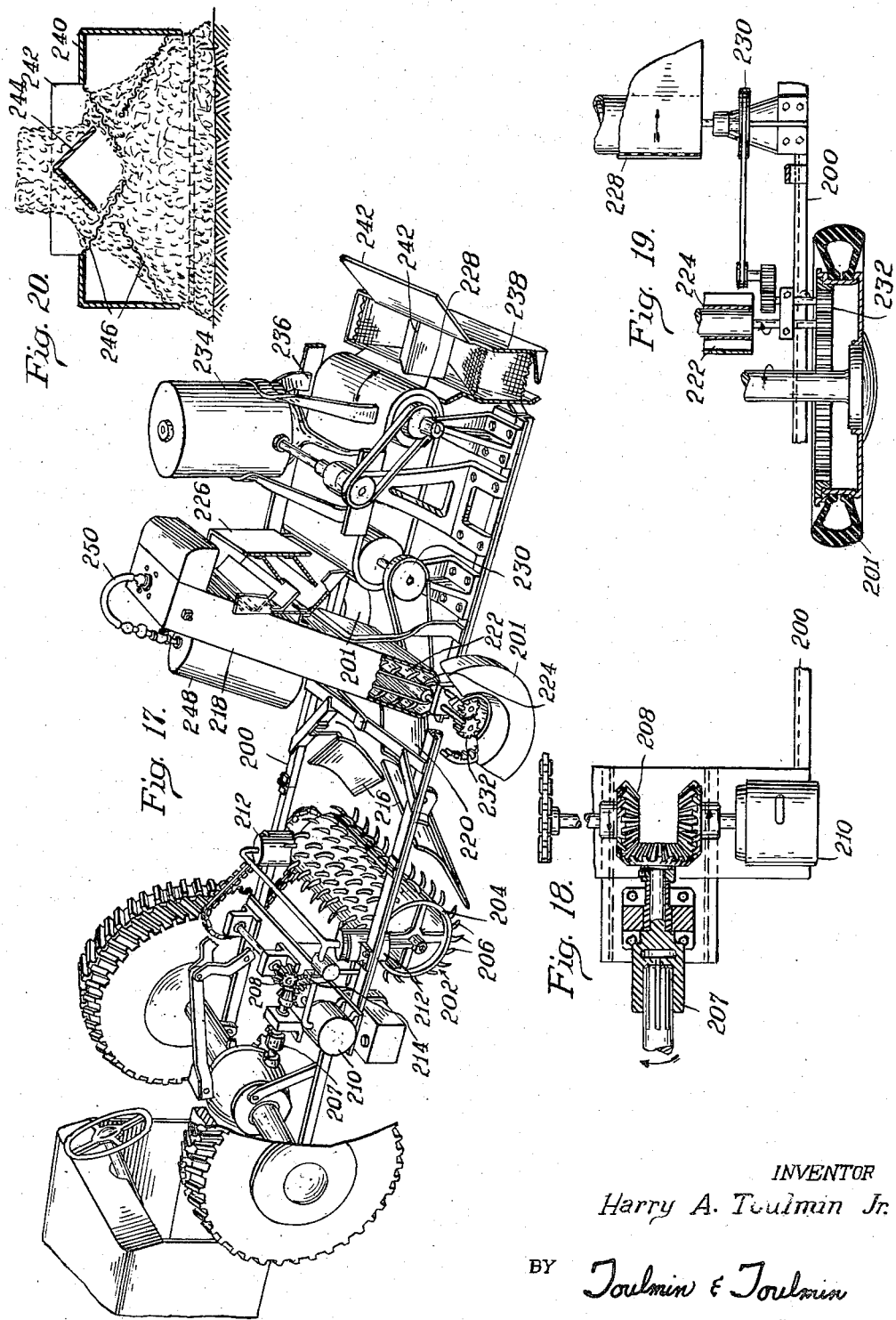

United States Patent Office 2,966,128
Patented Dec. 27, 1960

2,966,128

MACHINE FOR CONDITIONING SOIL

Harry A. Toulmin, Jr., Dayton, Ohio, assignor to The Commonwealth Engineering Company of Ohio, Dayton, Ohio, a corporation of Ohio Filed Sept. 3, 1953, Ser. No. 378,276

2 Claims. (Cl. 111—10)

This invention relates to agricultural machinery and more particularly pertains to an implement for conditioning the soil.

The cultivation or preparation of soil for the growing of crops requires many operations to be performed thereon. For example, it is always necessary to plow and harrow the ground in order to break it up and to divide it into small porous clusters. Furthermore, most solids need to be treated with some natural or synthetic soil conditioner in order to form stable agglomerates or aggregates with the clays and fine silts. This latter operation is done to preserve the loose porous condition created by prior tilling.

In the past each of these operations has generally been performed separately, that is, a plow originally breaks up the ground and turns it over; next a harrow is drawn over the plowed earth and so on. Finally after the soil has been mechanically prepared or tilled, another implement carrying the dry or liquid chemical soil conditioner sprays or otherwise spreads the conditioner over the soil.

The above described separately performed series of operations are naturally expensive and time consuming and thus inefficient in accomplishing the end result, namely, properly conditioned soil. Because of the time lag between operations, much of the effect of a prior performed operation is lost by the time the subsequent operation is performed. For example, the harrow breaks up the soil into a loose porous condition but by the time the chemical soil conditioner is applied, the soil might become crusty again, thereby preventing thorough infiltration by the conditioner.

Also, the application of soil conditioners to the top of the ground never yields a homogeneous treatment throughout the desired layer depth even if the soil retains its porous condition at the time the conditioner is applied.

It is, therefore, a primary object of this invention to provide a single combination agricultural implement for completely cultivating and chemically conditioning a discrete portion of soil in one continuous operation.

It is a further object of this invention to provide an agricultural implement for plowing, harrowing, tilling and in addition, chemically conditioning the soil in one operation.

It is still a further object of this invention to provide an agricultural implement for completely mechanically preparing a layer of soil and subsequently lifting the soil into a chamber for chemical treatment prior to its discharge back onto the ground.

It is another object of this invention to provide an agricultural implement as above, which can be operated by a single individual.

These and other objects of the invention will become more apparent upon reference to the following description and accompanying drawings, in which:

Figure 1 is a side view of a first embodiment of the invention showing the combination soil conditioning apparatus pulled by a tractor, Figure 2 is a side view of a second embodiment of the invention showing various modifications of Figure 1, Figure 3 is a section taken along lines 3—3 of Figure 2, Figure 4 is a detail view of a part of the conveyor of Figure 2, Figure 5 is a sectional view taken along lines 5—5 of Figure 2, Figure 6 is a sectional view taken along lines 6—6 of Figure 2, Figure 7 is a sectional view taken along lines 7—7 of Figure 6, Figure 8 is a partial detail view of the mixing chamber of Figure 2, Figure 9 is a partial detail view of the conveyor of Figure 2, Figure 10 is a sectional view taken along lines 10—10 of Figure 6, Figure 11 is a side view of a modified form of plow which can be used in the embodiment of Figures 1, 2 or 17, Figure 12 is an exploded side sectional view of the plow of Figure 11, Figure 13 is a sectional view taken along lines 13—13 of Figure 12, Figure 14 is a sectional view taken along lines 14—14 of Figure 12, Figure 15 is a sectional view taken along lines 15—15 of Figure 12, Figure 16 is a left hand side view of the plow of Figure 12 having a portion cut away, Figure 17 is a side view of a third embodiment of this invention, Figure 18 is a top plan detail view of a part of Figure 17, Figure 19 is a top plan detail view of another portion of Figure 17, and Figure 20 is a sectional detail view of the soil spreader used in Figure 17.

Referring in particular to Figure 1, the combination soil conditioning implement 10 is shown as being pulled by tractor 12. The conditioning implement consists of a horizontal frame 14 supported by wheels 16 in a conventional manner. At the forward end of the frame and dependingly supported therefrom are a plow 18 and disc harrow 20. It will be evident that these elements are located centrally of wheels 16 and as shown, the harrow 20 follows plow 18 through the ground.

A treating chamber 22 is positioned on top of frame 14 at the rear thereof and consists of a box-like housing enclosed at all sides except for the inlet and outlet areas. A conveyor 24 mounted on frame 14 picks up the soil by means of rotary scooper or scraper 26 connected to the conveyor and disposed immediately behind harrow 20 and carries it up to the treating or mixing chamber 22 in which it is dumped through discharge passage 25. Within the treating chamber at the bottom thereof is an endless belt conveyor (not shown) which serves to catch the soil and carry it towards the discharge outlet 28. As the soil falls from the top of conveyor 24 towards the belt and as it rides along the latter it is constantly sprayed with a chemical soil conditioner such as a sodium salt of acrylonitrile or the like. The chemical soil conditioner may be contained in tank 30 extending into the chamber 22 through conduit 32 out of which it is sprayed onto the soil. The supply from tank 30 is controlled by a suitable valve in the line. Alternatively the chemical conditioner may be sprayed on in powder form in which event a blower must be provided.

After the soil has been chemically treated it is returned to the earth from whence it was removed through outlet opening 28.

The conveyor 24, scooper 26 and the conveyor within treating chamber 22 are all driven by a pulley and belt arrangement. The latter in turn is driven by a gasoline engine 36 shown mounted forwardly on frame 14. A tank 34 is provided for carrying a reserve supply of gas.

A hydraulic lift cylinder 38 is mounted on frame 14 and the piston 40 thereof is connected to the conveyor 24 along side flange 42. Thus, it will be clear that actuation of piston 40 will cause the conveyor to be raised or lowered in turn causing scooper 26 to accept more or less depth of soil layer. The discharge outlet 25 of conveyor 24 is slidable in the treating chamber inlet so that conveyor 24 may be conveniently raised and lowered without disturbing the connection between the conveyor and treating chamber.

From the foregoing it will be apparent that a strip of soil can be mechanically and chemically conditioned by first breaking up the soil; secondly, removing the soil from the ground; thirdly, treating the soil; and lastly, replacing the treated soil back on the ground. Furthermore, the device is capable of selecting a variety of depths as desired. These steps have been accomplished in one operation and by the use of one combined machine.

Figures 2-10 show a second embodiment of the present invention and although the basic principle of the invention as described in regard to Figure 1 is the same, in the second embodiment the manner of carrying it out differs.

Referring to Figures 2 and 3 in particular, there will be seen a tractor drawn frame 50 supported on wheels 51. A harrow arrangement consisting of a toothed harrow 52 and a two-ganged disc harrow 54 is carried on the front end of the frame. Toothed harrow 52 comprises a plurality of teeth 56 which are interconnected by bar 58 for vertical pivotal movement about their mounting axle 60. Adjustment of the teeth to the desired angle is effected by lever 62 connected to bar 58 and operable from the driver's seat on the tractor.

Dependingly mounted from the frame 50 immediately behind ganged harrow 54 are a pair of scrapers or scooping members 64 which are angularly arranged to gather the dirt or soil into a windrow. A conveyor 66 is mounted on frame 50 behind the scrapers 64 and is provided with a lower scooping portion 68 for gathering the soil arranged in a row by the scrapers 64. The conveyor is further provided with an endless belt 70 on which are mounted a plurality of spaced lifting trays 72 for an obvious purpose. A housing 74 integral with scooper 68 encloses the entire conveyor. The conveyor housing is angulated downwardly at the top, as best seen in Figure 9, and encloses a further endless belt 76 for receiving soil which is discharged from each of the trays 72. A deflector plate 78 is provided above the belt 76 to direct the soil downwardly.

It will be noted that belt 70 is mounted for rotation on axles at the top and bottom and that the lower axle 80 has a pulley 82 attached thereto. A gasoline engine 84 is mounted on frame 50 for driving the conveyor by belt 86 extending between pulley 82 and pulley 88 directly connected to the shaft of engine 84. The axle 90 at the top of the conveyor, as seen in Figure 9, is likewise equipped with a pulley 92 for driving belt 76, through a pulley and belt arrangement as will be clear.

The upper portion of housing 74 which is directed downwardly extends into the mixing and treating chamber 94 supported on the rear of frame 50. This chamber 94 is mounted for rotation in cradle 96 by means of the ring gears 98 and cooperating driving pinions 100 mounted on rotatable rod 110. Guide roller wheels 112 and 114 are provided at spaced intervals on the cradle 96 to respectively restrict longitudinal and vertical vibration of chamber 94, wheel 112 riding on the side of gear 98 and wheel 114 riding on track 115 on the side of chamber 94. A belt driven pulley arrangement 116 driven from engine 84 provides driving power for shaft 110.

A tapered outlet nozzle 118 is secured near its open end to frame 50, as indicated at 120 and is provided at its upper end with bearing means in the form of an annular band 122 for rotatively slidingly receiving chamber 94.

A hopper 124 is supported on frame 50 over chamber 94 by the trussed structure 126 and has an outlet spout 128 extending into chamber 94 above conveyor housing 74.

Supported on the front side of conveyor housing 74 is a tank 130 having an outlet conduit or line 132 extending into the top of conveyor housing 74, as shown in Figure 2. This tank may contain gas in which event a gas burner jet would be connected to the outlet line 132 within the housing 74 so as to direct the flame downwardly. Alternatively the tank may contain some treating chemical in which case an ordinary spray nozzle would be connected to conduit 132. If desired, a valve is provided in conduit 132 for completely cutting off the supply for tank 130.

A variation of the apparatus of Figure 2 described above is to utilize a central burner in rotary chamber 94 thus forming a rotary kiln thereof. When such is employed the tank 130 is generally not used or if used, sprays a chemical on the conveyed soil. However, if soil contamination is more than usual, it may be found necessary to subject the soil to both heat treatments to effectively kill the insects etc.

In operation the apparatus of Figures 2-10 is driven over the soil to be treated. Harrows 52 and 54 cut up the clods and tend to render the soil loose and porous. Scrapers 64 push the relatively loose chunks of soil into a windrow where it is picked up by a conveyor scooper 68 and trays 72. The elevated soil is then dumped into the rotating treating chamber 94 where it is mixed with chemicals either in solid or liquid form fed in from hopper 124. The inside of chamber 94 may be provided with baffles to aid in pulverizing and further intimately mixing the soil particles with the treating chemical.

As previously indicated, tank 130 may supply gas to a burner for heating the soil as it ascends the conveyor. This treatment increases the temperature of the soil to the extent necessary to kill various insects and pests in the soil and also aids in softening the soil prior to final mixing in the chamber 94. Thus not only are insects killed but better mixing with the soil conditioning chemical is insured. Alternatively a liquid soil conditioning chemical may be supplied from tank 130 and in an obvious manner.

After the soil has gone through the above treating stages it is discharged through spout 118 onto rotating blades 134 for dispersal onto the ground. Blades 139 may be driven in any manner such as from the rear axle or from engine 84.

Figures 11-15 illustrate a rotary vertical subsoil plow 150 which may alternatively be used with the embodiment of Figures 2-10. Although in Figure 11, the plow is shown mounted in a separate frame 152, it may be incorporated onto frame 50 in front of toothed harrow 52 or the frame 152 may be provided with wheels as 153 and a means for connecting the frame to the front of a tractor.

The plow itself, as illustrated in Figure 12, may consist of a plurality of vertically mounted shafts 154 carrying auger blades 156 at their lower ends. As many shafts as appear desirable may be utilized but three have proven satisfactory. Each shaft is of such length that the auger blades are at successively greater depths from the front to the rear. It is to be understood that the shorter shaft is in front and the longer shaft in the rear when actually plowing so that the blades on the shorter shaft will cut into the top soil leaving a path clear for the next blade to break subsoil and so on.

Each shaft 154 is rotatively journalled in a sleeve 158 by roller bearing means 160. The lower portion 162 of shaft 154 within sleeve 158 has a smooth exterior and is held against vertical movement relative to the sleeve by threaded nut 164 engaging interior threads on the upper portion of sleeve 158.

Each of the sleeves 158 is mounted for vertical reciprocation in a housing 168 which has cylindrical bores 170 therein for slidingly receiving the sleeves 158. The upper portion of housing 168 is laterally expanded as best shown in Figures 13, 15 and 16 and comprises a gear box 172. The upper portion 174 of each shaft 154 is splined for non-rotatively but longitudinally slidingly receiving the gears 176. These gears 176 intermesh as seen in Figure 13 and are driven from worm gear 178 which in turn may be connected to the power take-off shaft of the tractor.

The sleeves 158 and thereby the shafts 154 are vertically reciprocally controlled by an air cylinder 180 positioned on top of housing 168. Within cylinder 180 is a slidable piston 182 having a depending rod 184 which is rigidly secured to a horizontal plate 186 within housing 168 and above gear box 172. Vertical grooves 188 are provided in the side of the housing for slidingly receiving the lateral extensions 190 on the plate 186. The upper ends of each shaft 154 are rigidly secured in plate 186 such that upon vertical movement of piston 182 each of the shafts 154 will reciprocate vertically through gears 176 thereby causing the auger blades 156 to reciprocate vertically. Ports 192 and 194 are connected by lines to any suitable supply of air for controlling piston movement.

This rotary plow can, therefore, be adjusted to vary the depth of plowing desired and to insure that subsoil is brought to the surface to be treated in like manner with the top soil. As previously noted, this plow is preferably attached to frame 50 immediately in front of toothed harrow 52 whereby complete treatment of the soil may be had by one combined machine.

A further embodiment of this invention is shown in Figures 17–20 and as before comprises a tractor drawn chassis or frame 200 supported by wheels 201.

Between the sides of the frame 200 and immediately behind the tractor is a rotary tiller 202 consisting of a rotating drum 204 having curved teeth 206 disposed in rows around the periphery. The drum 204 is rotated by a chain drive from the power take-off 207 of the tractor, connected through a conventional gearing arrangement 208. A hydraulic pump 210 feeds a pair of hydraulic lift cylinders 212 for adjusting the height of the tiller 202. Valve 214 is provided in the line leading to the cylinders to make this adjustment.

As in the previous embodiments, a pair of scraper blades 216 are mounted on frame 200 behind the tilling device 202. A conveyor 218, similar to conveyor 66, is mounted to frame 200 behind the scraper blades 216 and has a scooper 220 for catching the soil so that it may be elevated by trays 222 on endless belt 224. Trays 222 dump the soil down through a multiple baffle arrangement 226 on the back of the conveyor onto an endless rotating and horizontally arranged belt 228 which is supported on the rear of frame 200. The conveyor belt 224 and belt 228 are both driven by a conventional pulley and belt apparatus 230 connected through an internal gear 232 on wheel 201.

Positioned above belt 228 is a hopper 234 for carrying and dispensing of liquid or solid soil conditioning chemicals through the fan spout 236 onto the soil as it passes along belt 228. A blower or mixing blade (not shown) is provided inside the hopper 234 and is driven by a pulley arrangement coupled to the belt 228.

The treated soil is dumped from belt 228 into the soil spreader 238 secured to the rear end of the frame 200. The spreader comprises a housing 240 with an upwardly extending baffle plate 242. Centrally mounted in the top of the housing is an inverted V-shaped plate 244 for diverting the soil onto angulated foraminous screens, as 246 prior to its discharge onto the ground.

As in the previous embodiment, a tank 248 is secured to the front of conveyor 218 and through a conduit 250 supplies either a soil conditioning chemical or gas to a nozzle or gas burner in the top of the conveyor.

It should be understood that a plow such as that shown in Figure 1 (numeral 18) or Figure 11 (numeral 150) could be attached to the frame 200 if desired.

The operation of the apparatus of Figures 17–20 will be briefly explained. As the tractor drives the unit over the ground, the rotary tiller breaks up the soil into a relatively loose and porous state and the scrapers urge this soil into the conveyor scooper from where it is elevated. The soil is either heat treated or sprayed with a conditioner from tank 248, as the case may be, and then it is dumped onto the baffle plates 226. These baffles have the further effect of breaking up chunks of the soil and keeping it in a loose condition. The soil then spreads rather evenly in a thin layer on rotating belt 228 where it is carried under hopper spout 236 and again treated with soil conditioning chemicals. Belt 228 dumps the treated soil into spreader 238 where again the construction of the housing is effective in keeping the soil loose and in a mixed condition with the treating chemicals so that it is evenly distributed on the ground.

From the above it will be evident that various apparaturs have been provided for taking a strip of soil, initially loosening this soil and immediately lifting this strip or portion of soil into some type of treating chamber where chemicals are mixed and intimately associated with the soil. Not only are means provided to control the depth of layer it is desired to treat, but furthermore, this layer once selected is homogeneously treated with the conditioner. Since it is the purpose of synthetic or natural soil conditioners to stabilize the loose porous condition of soil created by plowing and harrowing, this invention offers the great advantage of being able to treat plowed or tilled soil immediately after such tilling or plowing. Clearly this is when the soil conditioner will have its greatest effect.

It has long been a problem with soil conditioners to obtain homogeneous treatment of a layer of soil by surface spraying and like methods. This has been particularly true with conditioners in solution form. However, with the present invention, this no longer need be troublesome since each particle of soil in a particular layer is similarly treated whether it be in the mixing chambers disclosed or on the flat surface of an endless belt.

It will be understood that this invention is susceptible to modification according to various usages and conditions and accordingly, it is desired to comprehend such modifications within the scope of the appended claims.

What I claim is:

1. A mobile soil conditioning machine of the character described comprising a wheeled frame, means for driving said frame over the ground in a forward direction, a plow mounted on the underside on the forward portion of said frame for breaking up the soil, a harrow mounted on said frame rearwardly of said plow for rendering said broken up soil loose and porous, scraper means mounted on the underside of said frame behind said harrow for scooping up said soil, an elevating conveyor having an upper end and a lower end mounted on said frame rearwardly of said scraper means with said conveyor lower end immediately rearward of said scraper for elevating the soil scooped by said scraper, a housing enclosing said elevating conveyer, heating means on said conveyor housing for heating said soil when being elevated on said conveyer, means beneath the upper end of said conveyer to receive soil therefrom for uniformly discharging the soil elevated by said conveyor, means on said wheeled frame rearwardly of said soil receiving means for receiving said discharged soil and comprising a chemical soil treating apparatus mounted on the rear of said frame, and means on said wheeled frame rearwardly of said soil treating apparatus for receiving soil from said treating apparatus for scattering the treated soil back on the ground.

2. A mobile soil conditioning machine of the character described comprising a wheeled frame, means for driving said frame over the ground in a forward direction, a plow mounted on the underside on the forward portion of said frame for breaking up the soil, a harrow mounted on said frame rearwardly of said plow for rendering said broken up soil loose and porous, a pair of scraper blades behind said plow and converging toward the rear of said frame to scrape the plowed soil into a windrow, a scoop rearwardly of said converging scraper blades to scoop up the scraped soil, an elevating conveyer having an upper end and a lower end mounted on said frame with the lower end rearwardly of said scoop so that the scooped soil is discharged on said conveyer, a housing enclosing said elevating conveyer, a burner within said housing to heat the soil as it is being elevated on said conveyer, an endless belt positioned immediately below the upper end of said conveyer to receive soil therefrom and for uniformly discharging the elevated soil, a rotary chamber on said frame rearwardly of said endless belt for receiving the soil uniformly discharged from said belt and having a chemical soil treating apparatus therein for treating the soil within said chamber, and a rotating blade at the rear end of said frame under the discharge end of said rotary chamber to uniformly scatter the treated soil back onto the ground.

References Cited in the file of this patent

UNITED STATES PATENTS

| 971,990 | Grantham | Oct. 4, 1910 |
|---|---|---|
| 1,295,281 | Denny | Feb. 25, 1919 |
| 1,303,150 | August | May 6, 1919 |
| 1,444,794 | Kernan | Feb. 13, 1923 |
| 1,500,437 | Burton | July 8, 1924 |
| 2,027,502 | Weismuller | Jan. 14, 1936 |
| 2,067,781 | Mueller | Jan. 12, 1937 |
| 2,110,997 | Mayfield | Mar. 15, 1938 |
| 2,138,904 | Carswell | Dec. 6, 1938 |
| 2,257,637 | Moore | Sept. 30, 1941 |
| 2,303,726 | Dettloff et al. | Dec. 1, 1942 |
| 2,454,662 | Marsh | Nov. 23, 1948 |
| 2,532,424 | Rose | Dec. 5, 1950 |
| 2,563,926 | Elliott et al. | Aug. 14, 1951 |
| 2,627,712 | Chatten | Feb. 10, 1953 |
| 2,755,719 | Toulmin | July 24, 1956 |
| 2,788,725 | Wilkey et al. | Apr. 16, 1957 |